June 18, 1946.   W. F. SANDS   2,402,260
PERMEABILITY TUNED SHORT-WAVE SPREAD-BAND RECEIVER
Filed Oct. 24, 1942   2 Sheets-Sheet 2

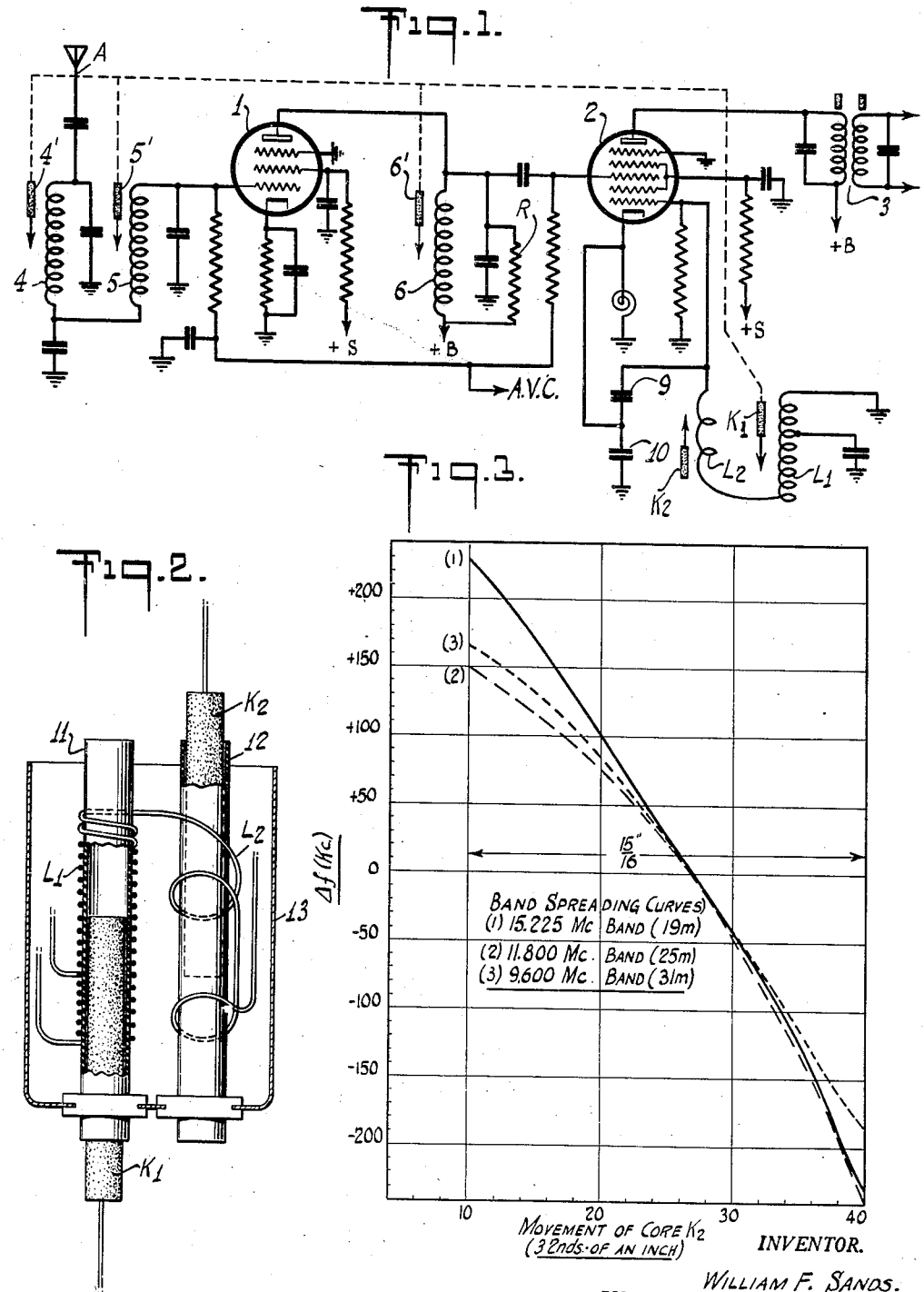

INVENTOR
WILLIAM F. SANDS.
BY H.S. Grover
ATTORNEY

Patented June 18, 1946

2,402,260

UNITED STATES PATENT OFFICE 2,402,260

PERMEABILITY TUNED SHORT-WAVE SPREAD-BAND RECEIVER

William Francis Sands, West Collingswood, N. J., assignor to Radio Corporation of America, a corporation of Delaware Application October 24, 1942, Serial No. 463,193

16 Claims. (Cl. 250—40)

1

The present invention relates to permeability tuned short-wave receivers, and more particularly to improved band-spreading means for use in such receivers.

Arrangements are known in the art for securing an equal or a predetermined amount of spreading in the several short-wave bands, but these generally consist of shunting, or otherwise connecting, a separate set of coils for each spread-band across the main short-wave coils.

In simpler systems in which one set of band-spreading elements is made to serve for all short-wave bands, a separate band-spread knob, or control, is provided on the receiver, and there have been utilized for this purpose (1) variable capacitors across the whole or a portion of the coils and (2) auxiliary tunable coils shunted across a portion, or the whole, of the main coils. The disadvantage of these simpler arrangements is that, in general, the same, or a predetermined amount of spreading in each band cannot readily be obtained.

It is therefore one of the objects of the present invention to provide simple means for securing substantially a uniform change in frequency, and also the same or a predetermined amount of band-spreading in each of a multiplicity of short-wave spread-bands. By reason thereof it is possible to provide the receiver with a single calibration or band-spread scale for all of the short-wave spread-bands.

Another object is to provide a novel band-spreading oscillator circuit which will provide approximately linear frequency variation in each of the selected bands, or the same, or a required differing amount of frequency variation in each of the several bands.

A further object is the application of the invention to one or more of the signal frequency circuits in order to improve the electrical performance at the edges of the spread-bands.

The novel features characteristic of my invention are set forth with particularity in the appended claims. The invention itself, however, both as to its organization and mode of operation together with further objects and advantages thereof, will best be understood by reference to the following description taken in connection with the accompanying drawings in which Fig. 1 is a circuit diagram of only that portion of a superheterodyne receiver wherein the present invention is involved;

Fig. 2 is a view, partly in section, of the band-spread core and coil assembly utilized in the present invention;

2

Fig. 3 shows actual band-spreading curves obtained by use of the invention for certain of the short-wave bands;

Figure 4:
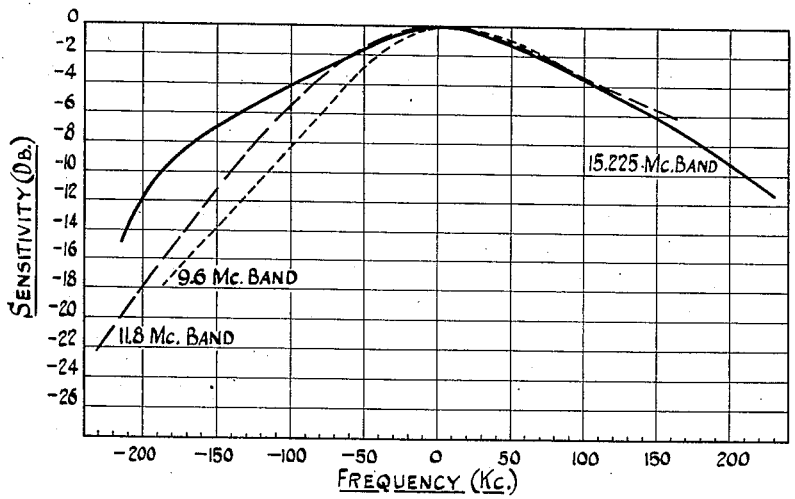
Fig. 4 are curves showing the relative sensitivity of the receiver utilizing the circuit of Fig. 1.

In Fig. 1 I have shown so much of a short-wave superheterodyne receiver as is necessary for an understanding of the present invention. Briefly, the circuit comprises a pair of short-wave coils 4 and 5 which are tuned by their respective movable magnetic cores 4′ and 5′ and which are arranged with their associated capacitors to constitute a band-pass filter. The latter is connected between the antenna A or other suitable signal input source and the radio frequency amplifier tube 1. The output of the signal frequency amplifier includes the short-wave coil 6 which is tunable by the movable magnetic core 6′. The amplified signals are fed to the combined detector-oscillator tube 2, the oscillator portion of which contains the main short-wave oscillator coil $L_1$ and the auxiliary coil $L_2$ which is connected in series with the coil $L_1$ at the high potential end thereof. Co-operating with the coils $L_1$ and $L_2$ are the respective movable magnetic cores $K_1$ and $K_2$. In addition to the main and auxiliary oscillator coils the frequency determining circuit of the oscillator, represented here as of the Colpitts type, contains the two series condensers 9 and 10 which are connected in shunt to the coils, with the cathode of the tube connected to their common terminal. The resulting intermediate frequency appearing in the output of the detector-oscillator is then fed to the I. F. network 3, and in turn are amplified, detected and reproduced in the usual manner.

As described and claimed in my application filed concurrently herewith, Serial No. 463,194, the cores 4′ to 6′ of the signal frequency circuits and the core $K_1$ of the oscillator circuit are selectively actuated in unison to one of several predetermined positions corresponding to the center-frequencies of the short-wave bands, which, in the example given, may be the 16, 19, 25 and 31 meter bands, and the auxiliary or spread-band core $K_2$ is separately actuated to effect spread-band tuning over each of the several bands. The present application is directed specifically to the band-spread circuit utilizing the above auxiliary core and coil, and to the arrangement and geometry of said elements.

In Fig. 2 I have shown a practical embodiment of the assembly of the main and auxiliary oscillator coils and cores. The coil forms 11 and 12 are of identical dimensions, are arranged in parallel relation within a shield can 13, and have wound thereon respectively the main and auxiliary coils $L_1$ and $L_2$ properly phased. The data for an embodiment that has been successfully used is given below.

$L_1$: 19 turns #25 en.; length=1 11/64″; tap at 6 7/8 turns.
$L_2$: 1 1/2 turns #25 en.; length=1 11/64″.
$K_1$: Length=1 23/64″; diam.=.250″; Carbonyl iron.
$K_2$: Length=1 23/64″; diam.=.250″; Carbonyl iron.

The two coils were centered in the shield can with 1/2 inch spacing between the centers of the coil forms. The shield can 13 serves not only in its normal shielding function but also acts to restrain the lines of flux and thus enhances the effect of auxiliary core $K_2$.

The performance of the arrangement disclosed in Fig. 2 depends upon the proper combination of the following three factors or means which affect the frequency variation of the circuit under consideration.

(1) Change in $L_1$ due to movement of the core $K_2$ into the field of $L_1$.
(2) Change in circuit inductance due to core $K_2$ penetrating into the coil $L_2$.
(3) Actual change in the mutual inductance between coils $L_1$ and $L_2$, depending upon the relative positions of the two cores $K_1$ and $K_2$.

The importance of the above factors will be seen from the following. The oscillator was adjusted to the center-frequency of the 31 meter band (i. e. 9.6+0.455 mc.) and coils $L_1$ and $L_2$ were connected in aiding phase. A frequency change or spreading of 620 kc. was obtained for the full stroke movement (1 1/4″) of the auxiliary core $K_2$. The leads between $L_1$ and $L_2$ were then reversed so that the coupling between coils $L_1$ and $L_2$ were in phase opposition, and the frequency variation for the same movement of the core $K_2$ was found to be only 100 kc. This demonstrates that the sign of the change in mutual inductance is made such upon reversal of the leads as to almost completely cancel the changes due to the factors 1 and 2 above.

The importance of providing coupling between the two coils and the effect of auxiliary core $K_2$ upon the inductance of $L_1$ was shown by having the assembly tested with a metal partition disposed between $L_1$ and $L_2$. The frequency variation due to the movement of $K_2$ was found to be both insufficient and non-linear.

The amount of control which may be secured over the three factors above is governed by: the relative number of turns in $L_1$ and $L_2$; the pitch of turns on $L_2$ (either linear or variable); the spacing between $L_1$ and $L_2$; the effective permeability of $K_1$ and $K_2$ (not necessarily the same); and the use of a shield can small enough to constrain the lines of flux but not so close as to materially decrease the circuit Q.

Fig. 3 shows the curves that were obtained for a successful embodiment of the present invention. The particular three bands covered are given in column $a$ in the table below. It was desirable that the required amount of spreading be available with a total movement of the auxiliary core $K_2$ identical with that of the manual tuning stroke for the broadcast band, since as disclosed in my above application the cores for the broadcast band and the core $K_2$ are carried by the same slidable carriage. In the example given the tuning stroke happened to be 15/16″. It was found, as may be seen from an examination of Fig. 3, that the portion of the available stroke from 5/16″ to 1 1/4″ provided the most linear 15/16″ region of frequency variation. The receiver alignment was performed with the core set at 27/32″ in order to obtain substantially the same amount of frequency variation on each side of the mid position.

Columns $b$ and $c$ indicate the frequencies and widths of the three short-wave bands under consideration. Column $d$ shows the available deviations for the 15/16″ motion, as shown in Fig. 3.

| Band | | | Measured variation (kc.) |
|---|---|---|---|
| m. (a) | f (mc.) (b) | Width (kc.) (c) | (d) |
| 31 | 9.5– 9.7 | 200 | 349 |
| 25 | 11.7–11.9 | 200 | 379 |
| 19 | 15.1–15.35 | 250 | 467 |

It is seen that a suitable margin of safety has been provided on each side of the center for frequency drift and for reset error in the band-setting mechanism. In addition, the variation for the 9.6 and 11.8 mc. bands are almost the same with a somewhat greater change for the 15.225 mc. band, as required. It will be observed also that all three curves are quite smooth and do not present a great departure from linear frequency change, particularly in the regions directly covered by the individual bands, i. e., ±100 kc. and ±125 kc. These results were obtained by proper attention to the three factors above mentioned.

Such refinements as having either $L_1$ or $L_2$ tilted with respect to the other; the use of powdered iron washers (or doughnuts) at the end or ends of one or both coils; the use of a magnetite or powdered iron shell between the shield can and the coils; and other arrangements such as are well known in the art, may be used to affect the extent and character of the band-spreading for a particular design.

In Fig. 4 there are shown, for the circuit of Fig. 1, curves depicting the relative loss in sensitivity in decibels over the three short-wave spread bands for which the band-spreading curves were plotted in Fig. 3. It will be seen that the sensitivity at the mid-band frequencies is substantially the same for all three bands, somewhat reduced for intermediate frequencies on either side of the center-frequency, and that the loss in sensitivity is increased towards the outer edges of each band. This is due in part to the fact that in the circuit of Fig. 1 only the oscillator is varied across the spread-band. Although by means of shunt loading the coil 6 in the radio frequency stage by means of resistor R and the use of coupling in the antenna stage (coils 4 and 5), a satisfactory band-pass characteristic is obtained to cover the width of the various spread-bands, there is a loss in sensitivity and also in image attenuation as departure is made from the center-frequency of the bands, as may be noted in Fig. 4.

Figure 5:
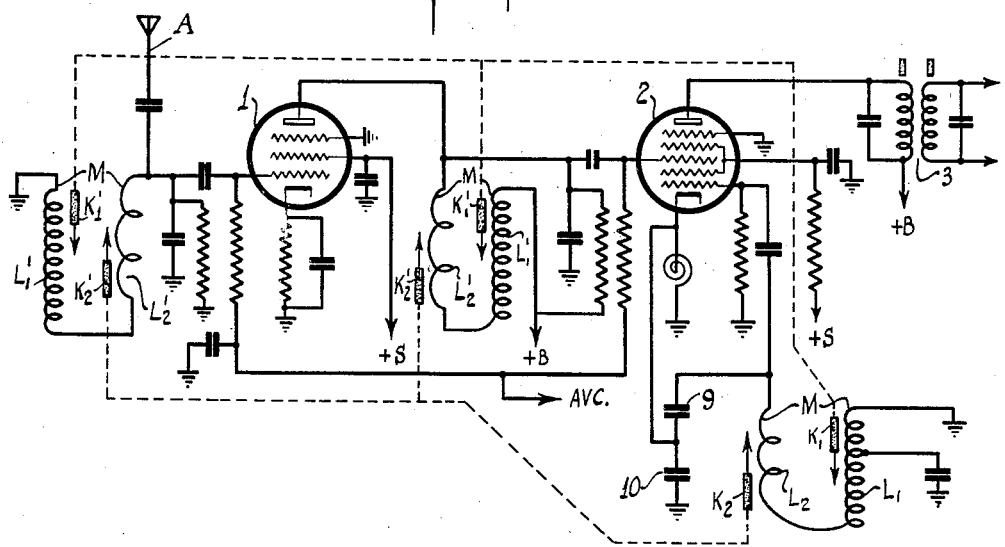
Fig. 5 is a circuit diagram similar to that of Fig. 1 showing the application of the invention to also the signal frequency circuits.

According to the circuit of Fig. 5, however, both the signal frequency circuits and the oscillator are varied across the various bands by means of the present invention. In this circuit the main antenna coil $L'_1$ has connected to it in series at the high potential end the auxiliary coil $L'_2$ and the similar coils $L'_1$ and $L'_2$ are connected to the output of the radio frequency amplifier. With the use of such circuits materially improved and uniform electrical performance with respect to sensitivity and image attenuation is obtained across each high frequency band. The effect of utilizing the band-spreading cores and coils in the additional circuits as shown in Fig. 5 is to restore the relative sensitivity curves of Fig. 4 to the zero $db$ axis. The auxiliary or band spread cores $K'_2$ are controlled simultaneously with core $K_2$ and the main cores $K'_1$ are uncontrolled with the main oscillator core $K_1$.

It is obvious that intermediate arrangements are capable of being designed and constructed in which one or more of the signal frequency coils would be used as a band-pass arrangement, while the remaining signal frequency coil and the oscillator circuit would be tuned across the spread bands by the subject invention.

The material used for the cores $K_1$ and $K_2$ was of small particle size Carbonyl iron, the kind that is commonly used to make high frequency cores. They need not necessarily have the same effective permeability. In those cases where the core $K_2$ actually effects a considerable increase in the circuit Q as it is inserted in the auxiliary coil $L_2$, and where such assemblies are used in one or more signal frequency circuits with particular coupling arrangements which result in the sensitivity, or response, being nominally lower on the low frequency side of each spread-band, the increase in Q can be used to somewhat maintain equal sensitivity on both sides of the individual bands.

Conversely, where coupling arrangements are used, such as are well known in the art, which nominally result in a lowered response on the high side of the band, a core may be readily selected for use as $K_2$ such that its penetration will effect a considerable decrease in the circuit Q, i. e., as the frequency is lowered. Thus a balance may again be maintained on each side of the spread-bands.

The present invention is an improvement over that disclosed in an application of J. J. Brand, Serial No. 466,417, filed November 21, 1942, assigned to the same assignee as this application.

The invention herein described is not limited to the superheterodyne type receivers but may be used wherever a simple means of providing a predetermined and uniform amount of band spreading is desired in one or a multiplicity of spread-bands.

What I claim is:

1. A permeability tuned circuit comprising a single main inductance and a single auxiliary inductance permanently connected in said circuit, a main magnetic core adjustable to vary the main inductance to thereby tune said circuit to a plurality of bands spaced apart in the frequency spectrum, and an auxiliary magnetic core movable with respect to the auxiliary inductance and adjustable separately from the main core for effecting band-spread tuning in each of said bands.

2. A permeability tuned circuit as defined in claim 1 wherein the main inductance core is first adjusted to selectively tune the circuit to substantially the mid-frequency of one of the several bands, and the auxiliary core is then adjusted to effect band-spread tuning within the selected band.

3. In a permeability tuning system, the combination of main and auxiliary tuning inductance windings of substantially the same winding length but of different numbers of turns, said windings being permanently included in the same resonant circuit and a pair of independently adjustable magnetic tuning cores, one for each of said inductance windings, the core for the main inductance winding arranged to select a predetermined band of frequencies and the core for the auxiliary inductance winding arranged to effect band-spread tuning within the band which is selected by adjustment of the main inductance core.

4. A resonant circuit adapted to be tuned through a plurality of frequency bands, comprising a main inductance coil, an auxiliary inductance coil and capacitance all connected in series, and an adjustable magnetic core for each of said coils, said coils and cores being so constructed and arranged that a particular adjustment of the main core to a set position determines the center-frequency of a selected one of the several bands and adjustment of the auxiliary core determines band-spread tuning within said selected one of the bands.

5. A resonant circuit adapted to be tuned through a plurality of frequency bands, comprising a main inductance coil, an auxiliary inductance coil and capacitance all connected in series, said coils having magnetic coupling between them and being of substantially the same winding length but of different numbers of turns, and an adjustable magnetic core for each of said coils, said coils and cores being so constructed and arranged that a particular adjustment of the main core determines the center-frequency of a selected one of the several bands and adjustment of the auxiliary core determines band-spread tuning within said selected one of the bands.

6. A resonant circuit adapted to be tuned through a plurality of frequency bands comprising a main inductance coil, an auxiliary inductance coil and capacitance all connected in series, said coils having magnetic coupling between them and being of substantially the same winding length but of different numbers of turns, an adjustable magnetic core for the main coil selectively settable only to positions which determine the respective center frequencies of the several bands, and a continuously movable auxiliary core for the auxiliary coil, adjustment of which determines band-spread tuning within each of the bands.

7. A permeability tuned circuit comprising a main coil, a movable magnetic core for said coil selectively settable to predetermined adjustments for selecting a band of frequencies at each adjustment, an auxiliary coil connected in series aiding relation with the main coil and having mutual coupling therewith, and a separately movable auxiliary magnetic core cooperating with said auxiliary coil, said coils and cores being so constructed and arranged that at a selected predetermined setting of the main core, movement of the auxiliary core through its range is effective to provide substantially linear band-spread frequency variation of said circuit.

8. A permeability tuned circuit comprising a main coil, a movable magnetic core for said coil settable to predetermined adjustments, an auxiliary coil connected in series aiding relation with the main coil and having mutual coupling therewith, and a separately movable magnetic core cooperating with said auxiliary coil, said coils and cores being so constructed and arranged that movement of the auxiliary core through a substantial portion of its range is effective to provide approximately linear frequency variation of said circuit and is effective also to change the inductance of the main coil, the circuit inductance and the mutual inductance between the main and auxiliary coils.

9. A permeability tuned circuit comprising a main coil, a movable magnetic core for said coil settable to predetermined adjustments, an auxiliary coil connected in series aiding relation with the main coil and having mutual coupling therewith, and a separately movable magnetic core cooperating with said auxiliary coil, said coils and cores being so constructed and arranged that movement of the auxiliary core through its range is effective to spread the tuning of said circuit, said band spreading resulting from the following changes in inductance: that of the main coil due to the penetration of the auxiliary core into the field of the main coil, that of the tuned circuit inductance due to the auxiliary core moving within its coil, and that of the mutual inductance between the main and auxiliary coils which depends upon the relative positions of the main and auxiliary cores.

10. In a short-wave receiver of the superheterodyne type provided with a signal frequency circut and an oscillator circuit and wherein each such circuit is provided with a main coil and a cooperating movable magnetic core adapted to be selectively set to one of a plurality of predetermined positions which correspond respectively to substantially mid-frequency positions of a plurality of short-wave bands, means associated with said oscillator circuit for effecting band-spread tuning in each of said bands, comprising an auxiliary coil connected to the main coil in series aiding relation, and a magnetic core cooperating with said auxiliary coil and movable independently of the main core for changing simultaneously the main coil inductance, the oscillator circuit inductance and the mutual coupling between the main and auxiliary coils.

11. In a short-wave receiver of the superheterodyne type provided with at least one signal frequency circuit and an oscillator circuit and wherein each such circuit is provided with a main coil and a cooperating movable magnetic core adapted to be selectively set to one of a plurality of predetermined positions which correspond respectively to substantially mid-frequency positions of a plurality of short-wave bands, means associated with both the signal frequency and oscillator circuits for effecting band-spread tuning in each of said bands, comprising an auxiliary coil connected to the main coil in series aiding relation and having mutual coupling therebetween, and a magnetic core cooperating with each auxiliary coil and movable independently of the main core for changing simultaneously the main coil inductance, the oscillator circuit inductance and the mutual coupling between the main and auxiliary coils in each of the circuits.

12. A coil assembly for effecting band-spread tuning in a radio receiver comprising a pair of coil forms arranged in substantially parallel relation, a coil wound continuously first around one form and then around the other, the number of turns wound around one of the forms being a fraction of the number of turns wound around the other form, and a pair of independently adjustable magnetic cores each movable within its respective coil form.

13. A coil assembly for effecting band-spread tuning in a radio receiver comprising a shield can, a pair of substantially parallel coil forms contained within the can, a coil wound continuously first around one form and then around the other, the number of turns wound around one of the forms being a fraction of the number of turns wound around the other form, and a pair of independently adjustable magnetic cores each movable within its respective coil form.

14. A coil assembly for effecting band-spread tuning in a plurality of short-wave bands, comprising a pair of coil forms arranged in substantially parallel relation, a single winding wound around first one form and then the other to provide a pair of coils of substantially the same winding length but differing in the number of turns, and a pair of independently adjustable magnetic cores each movable within its respective coil form.

15. A coil assembly for effecting band-spread tuning in a plurality of short-wave bands, comprising a pair of coil forms arranged in substantially parallel relation, a single winding wound around first one form and then the other to provide a main coil and an auxiliary coil of substantially the same winding length with the former having a larger number of turns than the latter, a pair of independently adjustable magnetic cores each movable within its respective coil form, and a shield can enclosing the coil assembly for constraining the lines of flux about the main coil.

16. A coil assembly for effecting band-spread tuning in a plurality of short-wave bands, comprising a pair of coil forms arranged in substantially parallel relation, a single winding wound around first one form and then the other to provide a main coil and an auxiliary coil of substantially the same winding length, the former having the larger number of turns, a movable magnetic core for the main coil settable to predetermined positions, and a separately movable magnetic core for the auxiliary coil adapted for continuous movement through its range of travel.

WILLIAM FRANCIS SANDS.